US012789105B2

(12) United States Patent
Sun

(10) Patent No.: US 12,789,105 B2
(45) Date of Patent: Nov. 10, 2026

(54) REPAIR BENCH

(71) Applicant: Shenzhen Dawn Model Technology Co., Ltd., Shenzhen (CN)

(72) Inventor: Changfei Sun, Wuhan City (CN)

( * ) Notice: Subject to any disclaimer, the term of this patent is extended or adjusted under 35 U.S.C. 154(b) by 188 days.

(21) Appl. No.: 18/817,575

(22) Filed: Aug. 28, 2024

(65) Prior Publication Data

US 2026/0034464 A1 Feb. 5, 2026

(30) Foreign Application Priority Data

Aug. 5, 2024 (CN) ........................ 202421888517.4

(51) Int. Cl.
*A63H 17/26* (2006.01)
*B25H 5/00* (2006.01)

(52) U.S. Cl.
CPC ............... *A63H 17/26* (2013.01); *B25H 5/00* (2013.01)

(58) Field of Classification Search
CPC .......... A63H 17/26; B25H 5/00; A61B 50/36; A47B 27/00
USPC ............................................................ 446/86
See application file for complete search history.

(56) References Cited

U.S. PATENT DOCUMENTS 6,811,127 B1 * 11/2004 Shiao ........................ B25H 3/04 211/DIG. 1
2010/0091482 A1 * 4/2010 Dow ......................... F21S 8/00 362/127

FOREIGN PATENT DOCUMENTS

| | | | | |
|---|---|---|---|---|
| CN | 105196238 A | * 12/2015 | ............... | B25H 5/00 |
| CN | 107198353 A | * 9/2017 | ............. | A47B 27/00 |
| CN | 209475044 U | * 10/2019 | | |
| CN | 110883746 A | * 3/2020 | ............... | B25H 5/00 |
| CN | 112451108 A | * 3/2021 | ............. | A61B 50/36 |

* cited by examiner

*Primary Examiner* — Peter M Poon
(74) *Attorney, Agent, or Firm* — SciNova; Jingfeng Song

(57) ABSTRACT

A repair bench includes a base, a working platform, and a telescopic connecting device. One end of the connecting device is connected to the working platform, and an opposite end of the connecting device is connected to the base. Therefore, when a user uses the working platform to repair a toy car, a height of the working platform is capable of being adjusted through the telescopic connecting device, making it convenient for the user to complete the repair work of the toy car at the most suitable height.

18 Claims, 9 Drawing Sheets

REPAIR BENCH

CROSS-REFERENCE TO RELATED APPLICATIONS

The application claims priority of Chinese patent application CN2024218885174, filed on Aug. 5, 2024, which is incorporated herein by reference in its entireties.

TECHNICAL FIELD

The present disclosure relates to the field of toy cars, particularly to a repair bench.

BACKGROUND ART

The main function of toy cars is for children's play, and the toy cars are usually scaled down according to the basic structure and appearance of a car in a certain proportion. These toys not only bring joy to children, but also have various practical and educational significance.

Toy cars have rich colors and diverse designs, which can attract children's attention, and stimulate their imagination and creativity. For example, children's track toy cars allow children to freely unleash their imagination on specific tracks and design their own unique gameplay.

Toy cars such as freewheels vehicles and children's wiggle ride-on cars can help children exercise balance, improve body coordination, and promote the development of motor skills. These toys are particularly suitable as transitional tools for young children learning to ride bicycles or use scooters.

Toy cars also play an important role in children's intellectual development. By operating toy cars, children can train their visual abilities, achieve hand-eye coordination, cultivate the concept of numbers, perform basic addition and subtraction operations, recognize colors, exercise wrist flexibility, and develop the ability to work with both hands alternately.

Toy cars can also enhance children's social skills. Children can play together and share the fun of toy cars, which helps them learn to cooperate and communicate with others.

However, as children's toys, toy cars are often easily damaged by children, so the toy cars need to be repaired frequently. However, the working platforms used for repairing toy cars on the current market are fixed, which is not convenient for users to repair toy cars.

Therefore, there is an urgent need on the market to provide a repair bench that is convenient for users to repair toy cars, so as to improve the efficiency of repairing toy cars.

SUMMARY

In order to overcome the shortcomings of the prior art, a repair bench is provided in the present disclosure, including a base, a working platform, and a telescopic connecting device. One end of the connecting device is connected to the working platform, and an opposite end of the connecting device is connected to the base.

As an improvement of the present disclosure, the connecting device includes a first connecting part and a second connecting part. A first mounting hole is defined in the second connecting part. The first connecting part is inserted into the first mounting hole. The first connecting part is movable and telescopic within the first mounting hole, and the first connecting part is rotatable within the first mounting hole.

As an improvement of the present disclosure, the first connecting part and the second connecting part are connected by threads, so that the first connecting part is capable of rotating along the threads and moving and telescoping in the first mounting hole to adjust a length of the connecting device.

As an improvement of the present disclosure, the first connecting part is equipped with a first external thread, and an inner wall of the first mounting hole is equipped with a first internal thread. The first external thread is connected to the first internal thread, and the first external thread is capable of rotating along the first internal thread to adjust the length of the connecting device.

As an improvement of the present disclosure, the first external thread extends from an upper side of the first connecting part to a lower side of the first connecting part, and the first mounting hole and the first internal thread extend from an upper side of the second connecting part to a lower side of the second connecting part.

As an improvement of the present disclosure, the repair bench further includes a locking device. The locking device is connected to the first connecting part or the second connecting part. The locking device is used for locking the first connecting part to the second connecting part, so that the first connecting part is not capable of moving and telescoping in the first mounting hole, and the first connecting part is not capable of rotating in the first mounting hole. When the locking device is unlocked, the first connecting part is capable of moving and telescoping within the first mounting hole, and the first connecting part is capable of rotating within the first mounting hole.

As an improvement of the present disclosure, the locking device includes a first locking member. The second connecting part is also equipped with a first inner surface, a first outer surface, and a first locking hole. The first locking hole penetrates from the first outer surface to the first inner surface. The first mounting hole and the first internal thread are provided on the first inner surface. The first locking member is threaded from the first outer surface through the first locking hole into the first inner surface and presses the first connecting part in the first mounting hole.

As an improvement of the present disclosure, the locking device further includes a second locking member, and the second connecting part is further provided with a second locking hole. The second locking hole penetrates from the first outer surface to the first inner surface. The second locking member is threaded from the first outer surface through the second locking hole into the first inner surface and presses the first connecting part in the first mounting hole.

As an improvement of the present disclosure, the first locking hole is positioned on a left side of the second connecting part, and the second locking hole is positioned on a right side of the second connecting part. The first locking member and the second locking member clamp the first connecting part in the first mounting hole. The first locking hole is internally equipped with a second internal thread, and the first locking member is equipped with a second external thread. The second internal thread is connected to the second external thread. The second locking hole is internally provided with a third internal thread, and the second locking member is provided with a third external thread. The third internal thread is connected to the third external thread.

As an improvement of the present disclosure, the repair bench further includes a magnetic attraction part. The magnetic attraction part is connected to the base or the working platform. The magnetic attraction part is used for magnetically attract metal parts. Alternatively, the base and/or the working platform are equipped with an accommodating groove. The accommodating groove is configured for accommodating parts.

As an improvement of the present disclosure, the repair bench further includes a counterweight block. The counterweight block is connected to the base.

As an improvement of the present disclosure, the working platform is connected to the first connecting part, and the base is connected to the second connecting part. The repair bench further includes first connecting members. The base is provided with second mounting holes. The second connecting part is also provided with third mounting holes, and the counterweight block is also provided with fourth mounting holes. The first connecting members sequentially pass through the fourth mounting holes, the second mounting holes, and the third mounting holes to connect the counterweight block, the base, and the second connecting part into a whole. The repair bench further includes a second connecting member. The working platform is provided with a fifth mounting hole, and the first connecting part is also provided with sixth mounting holes. The second connecting member sequentially passes through the fifth mounting hole and at least one of the sixth mounting holes to connect the working platform and the first connecting part into a whole.

As an improvement of the present disclosure, a middle portion of the working platform is concave downwards to form a first groove, and the fifth mounting hole is positioned on a bottom surface of the first groove. A middle portion of the base protrudes upwards to form a second groove, and the second mounting holes are positioned on a top surface of the second groove. The counterweight block is positioned inside the second groove.

As an improvement of the present disclosure, a plurality of first placement holes and a plurality of second placement holes are defined in the working platform. The first placement holes and the second placement holes are different in size. The plurality of first placement holes are positioned between the plurality of second placement holes.

As an improvement of the present disclosure, the repair bench is used for repairing a toy car, and the first placement holes and the second placement holes are used for the placement of parts of the toy car. An inner diameter of the first placement holes is greater than an inner diameter of the second placement holes.

As an improvement of the present disclosure, the repair bench further includes flexible anti-slip pads. The flexible anti-slip pads are connected to an upper surface of the working platform. The working platform is also equipped with shock absorber oil addition holes and first notches. The shock absorber oil addition holes are L-shaped, and the shock absorber oil addition holes are in communication with the first notches. The working platform also includes first stamping positioning holes, and the base also includes second stamping positioning holes. The base and/or the working platform are also equipped with welding holes. The welding holes are used for welding parts of the toy car. The repair bench further includes a plurality of flexible foot pads. The flexible foot pads are connected to a bottom surface of the base. First through holes and second through holes are defined in the anti-slip pads. The first through holes are aligned with the first placement holes, and the second through holes are aligned with the second placement holes.

As an improvement of the present disclosure, the base and/or the working platform are also equipped with scale markings. The scale markings are used for measuring dimensions of parts.

As an improvement of the present disclosure, the working platform is provided with a first supporting part, a second supporting part, and a first intermediate part. The first supporting part is connected to one side of the first intermediate part, and the second supporting part is connected to an opposite side of the first intermediate part. The first intermediate part is depressed downwards to form the first groove, and a length of the first intermediate part is less than a length of the first supporting part and a length of the second supporting part. The base is provided with a third supporting part, a fourth supporting part, and a second intermediate part. The third supporting part is connected to one side of the second intermediate part, and the fourth supporting part is connected to an opposite side of the second intermediate part. The second intermediate part protrudes upwards to form the second groove, and a length of the second intermediate part is less than a length of the third supporting part and a length of the fourth supporting part.

As an improvement of the present disclosure, a length range of the working platform is 10-840 mm, a width range of the working platform is 10-720 mm, a thickness range of the working platform is 1-12 mm, a length range of the first supporting part and a length range of the second supporting part are 10-840 mm, and a width range of the first supporting part and a width range of the second supporting part are 10-300 mm. A depth range of the first groove is 2-120 mm, and a width range of the first groove is 10-300 mm. A length range of the base is 10-840 mm, a width range of the base is 10-720 mm, a thickness range of the base is 1-12 mm, a length range of the third supporting part and a length range of the fourth supporting part are 10-840 mm, and a width range of the third supporting part and a width range of the fourth supporting part are 5-260 mm. A depth range of the second groove is 2-120 mm, and a width range of the second groove is 3-300 mm. A length range of the first connecting part is 2-450 mm, a width range of the first connecting part is 1-70 mm, a length range of the second connecting part is 2-360 mm, and a width range of the second connecting part is 2-150 mm. A length range of the counterweight block is 5-420 mm, a width range of the counterweight block is 3-180 mm, a thickness range of the counterweight block is 1-60 mm, and a weight range of the counterweight block is 20-1000 g.

As an improvement of the present disclosure, a length range of the magnetic attraction part is 5-500 mm, a width range of the magnetic attraction part is 2-180 mm, and a thickness range of the magnetic attraction part is 1-12 mm.

As an improvement of the present disclosure, a total number of the shock absorber oil addition holes is two, and the two shock absorber oil addition holes are respectively positioned on both sides of the working platform. A total number of the first notches is two, and the two first notches are respectively positioned on both sides of the working platform.

As an improvement of the present disclosure, a total number of the second mounting holes, a total number of he third mounting holes, and a total number of the fourth mounting holes are all two. The two second mounting holes are respectively positioned on both sides of the base, the two third mounting holes are respectively positioned on both sides of the second connecting part, and the two fourth mounting holes are respectively positioned on both sides of the counterweight block.

As an improvement of the present disclosure, the repair bench further includes the flexible anti-slip pads, and a total number of the flexible anti-slip pads is two. The two flexible anti-slip pads are respectively connected to the first supporting part and the second supporting part.

As an improvement of the present disclosure, an outer side wall of the second connecting part is equipped with a plurality of concave anti-slip lines.

As an improvement of the present disclosure, a length range of the anti-slip pads is 10-840 mm, a width range of the anti-slip pads is 10-300 mm, and a thickness range of the anti-slip pads is 1-18 mm. An inner diameter range of the first placement holes and an inner diameter range of the second placement holes are 2-100 mm.

Beneficial effects of the present disclosure are as follows. The repair bench is provided in the present disclosure, including the base, the working platform, and the telescopic connecting device. One end of the connecting device is connected to the working platform, and the other end of the connecting device is connected to the base. Therefore, when a user uses the working platform to repair the toy car, a height of the working platform is capable of being adjusted through the telescopic connecting device, facilitating the user to complete the repair work of the toy car at the most suitable height.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
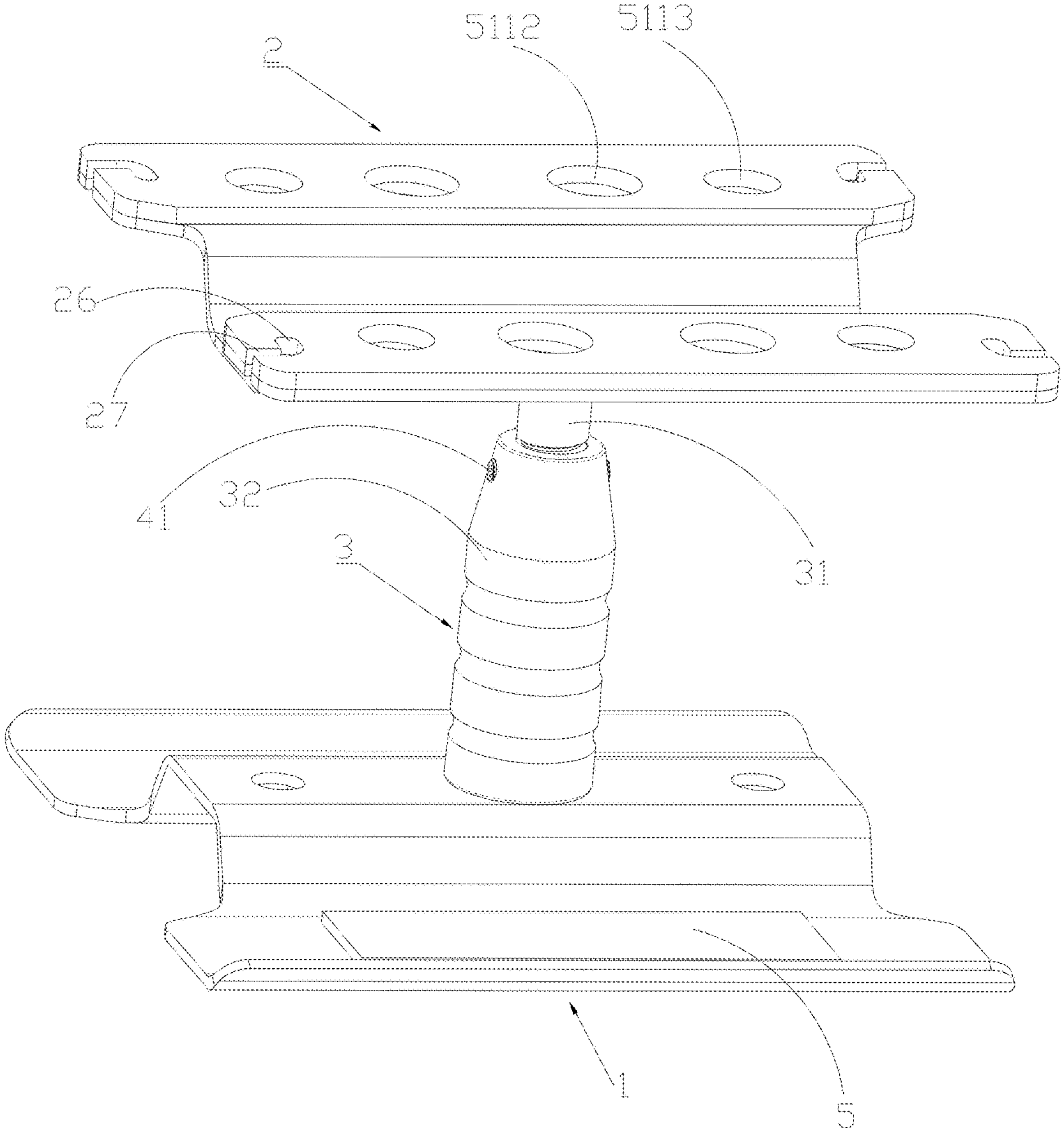
FIG. 1 is a schematic diagram of an overall structure of the present disclosure.
Figure 2:
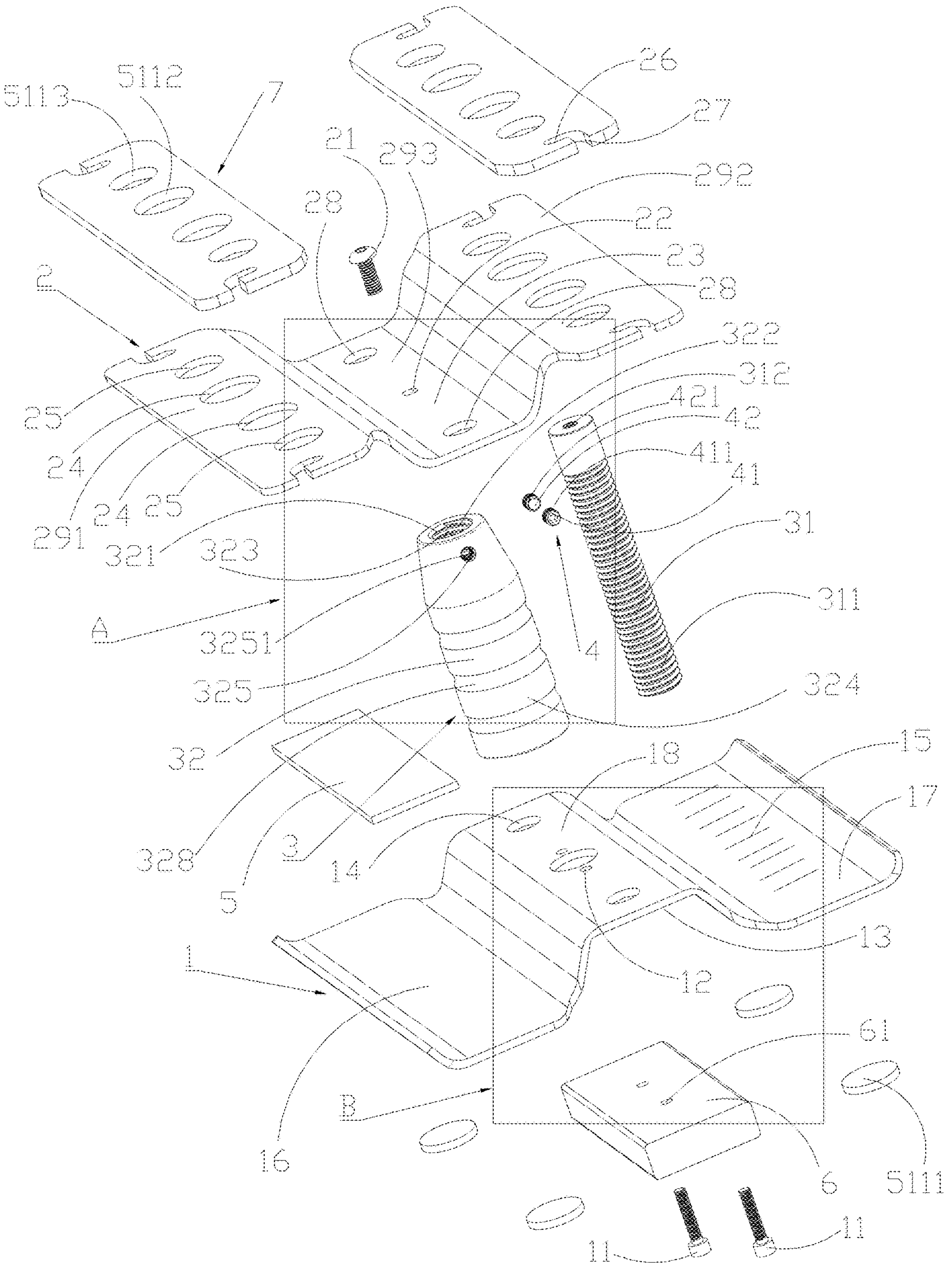
FIG. 2 is an exploded view of the present disclosure.
Figure 3:
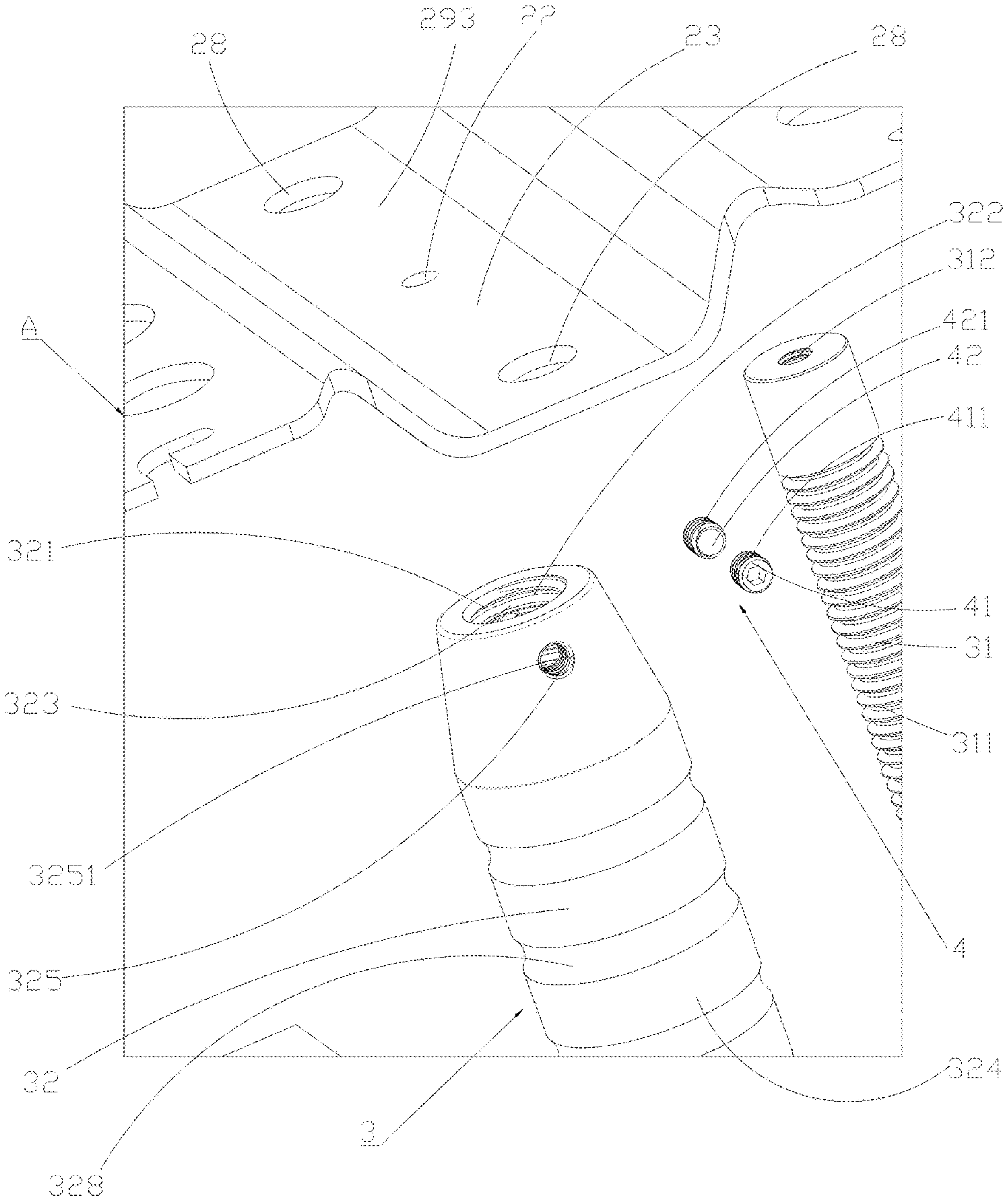
FIG. 3 is an enlarged view of area A in FIG. 2.
Figure 4:
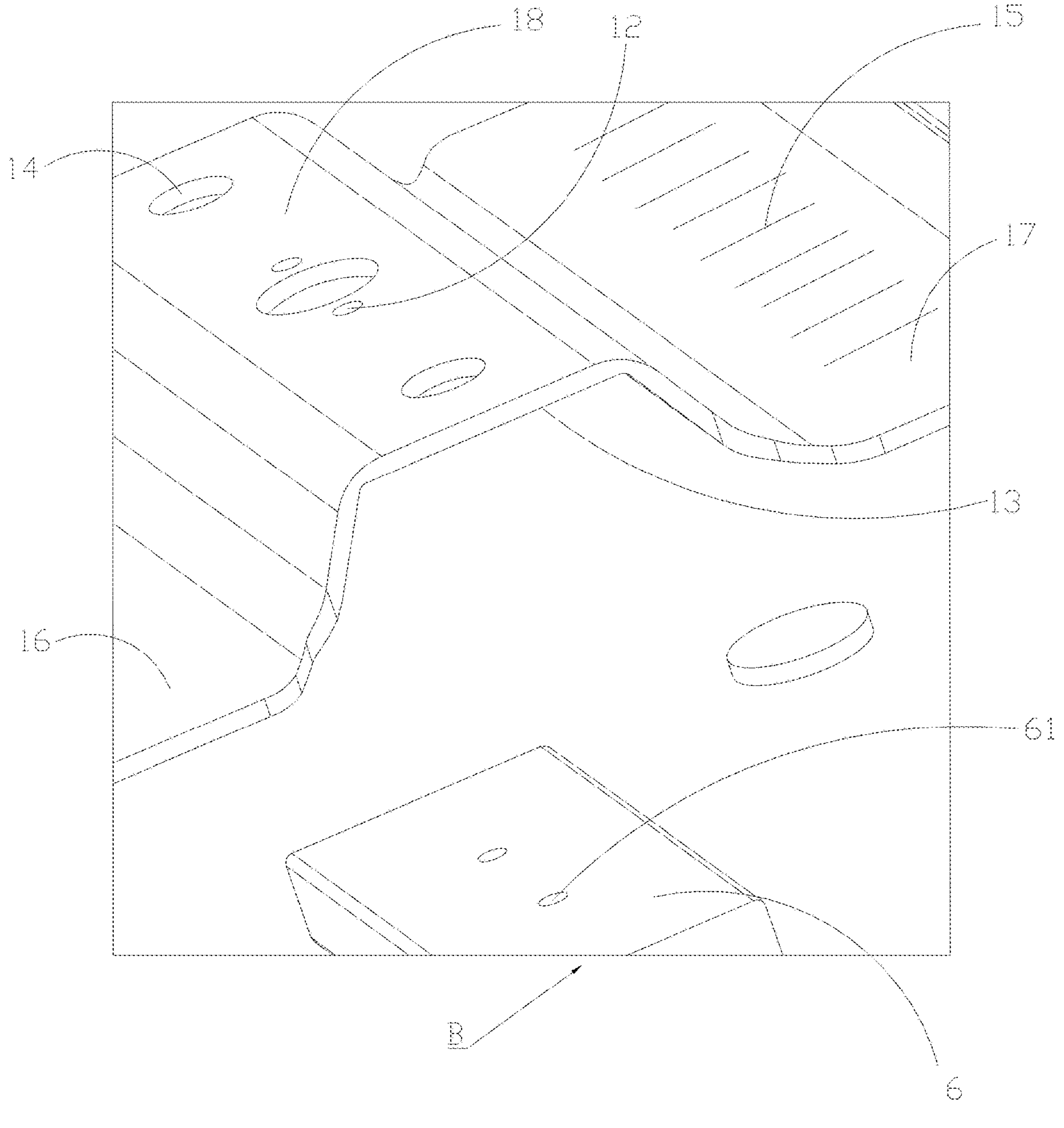
FIG. 4 is an enlarged view of area B in FIG. 2.
Figure 5:
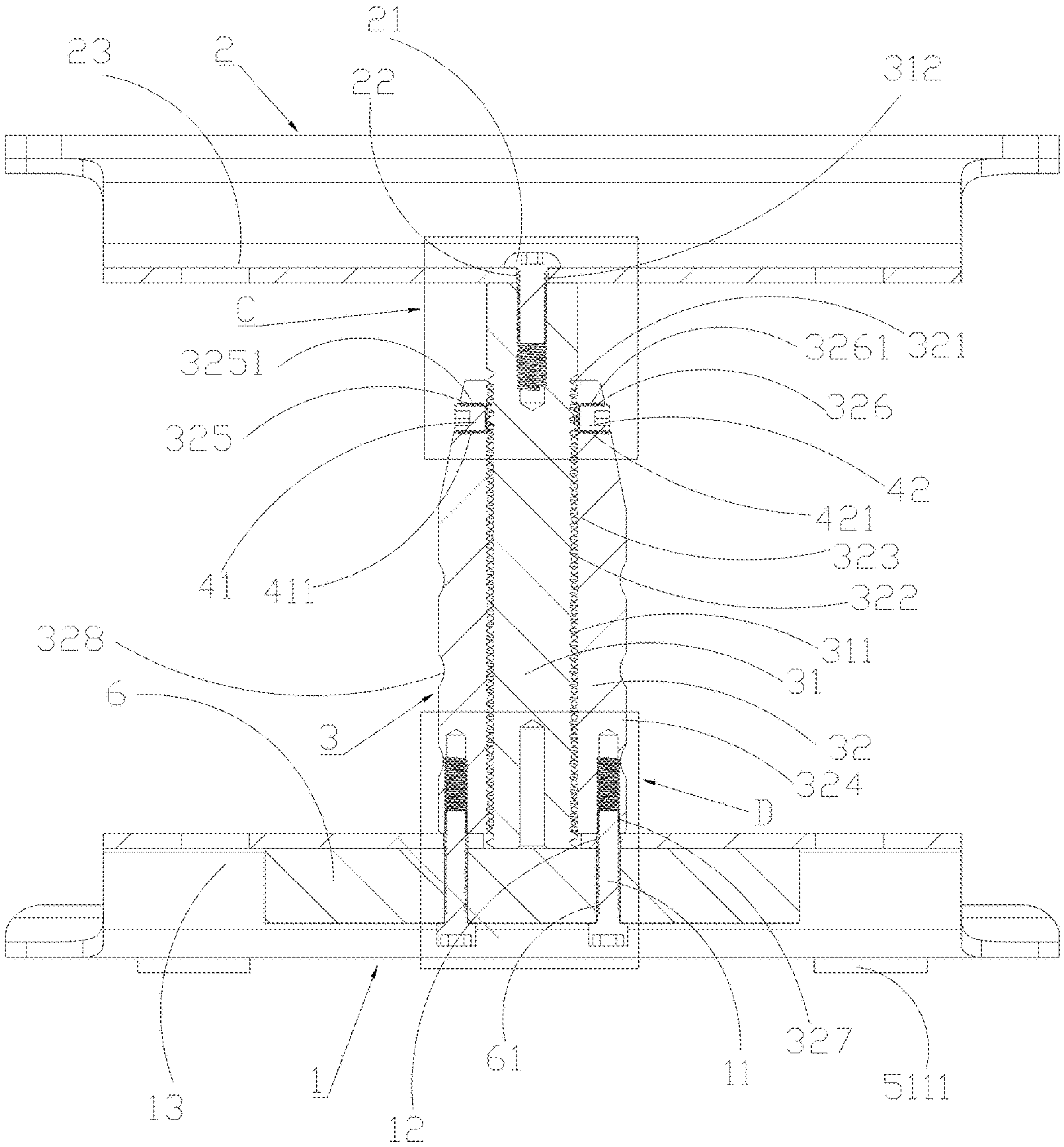
FIG. 5 is a sectional view cut along a working platform, a connecting device, and a base.
Figure 6:
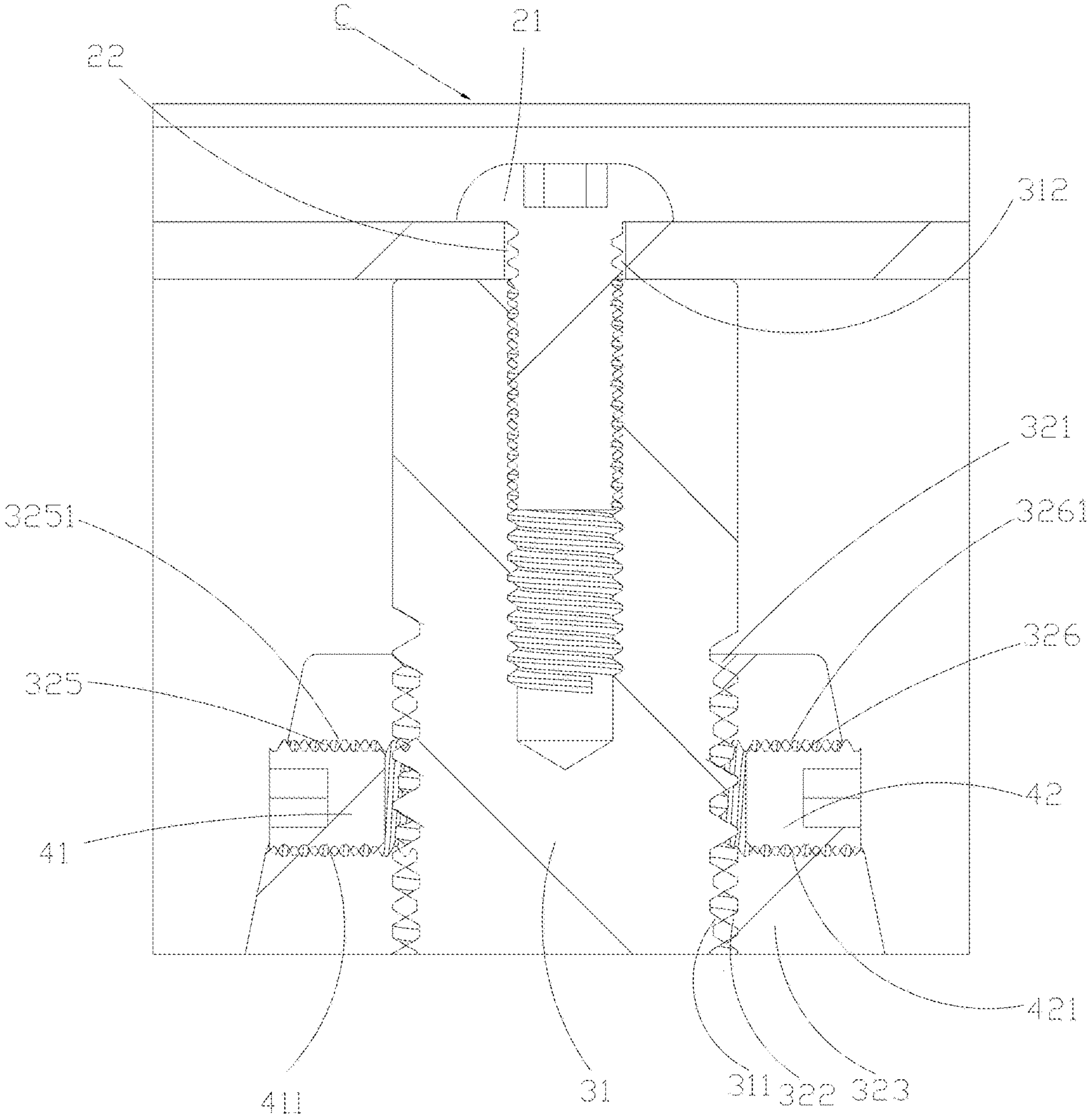
FIG. 6 is an enlarged view of area C in FIG. 5.
Figure 7:
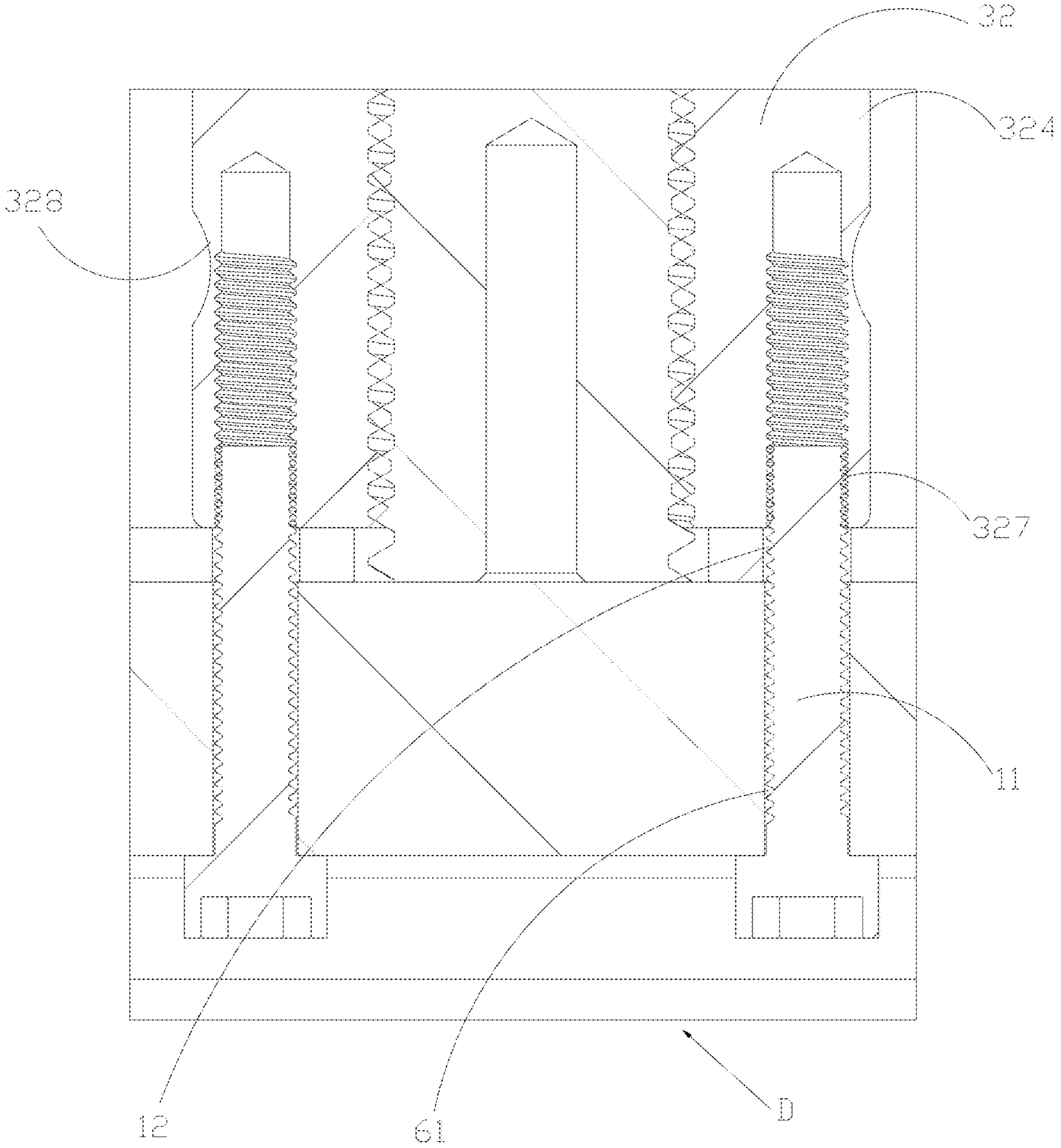
FIG. 7 is an enlarged view of area D in FIG. 5.
Figure 8:
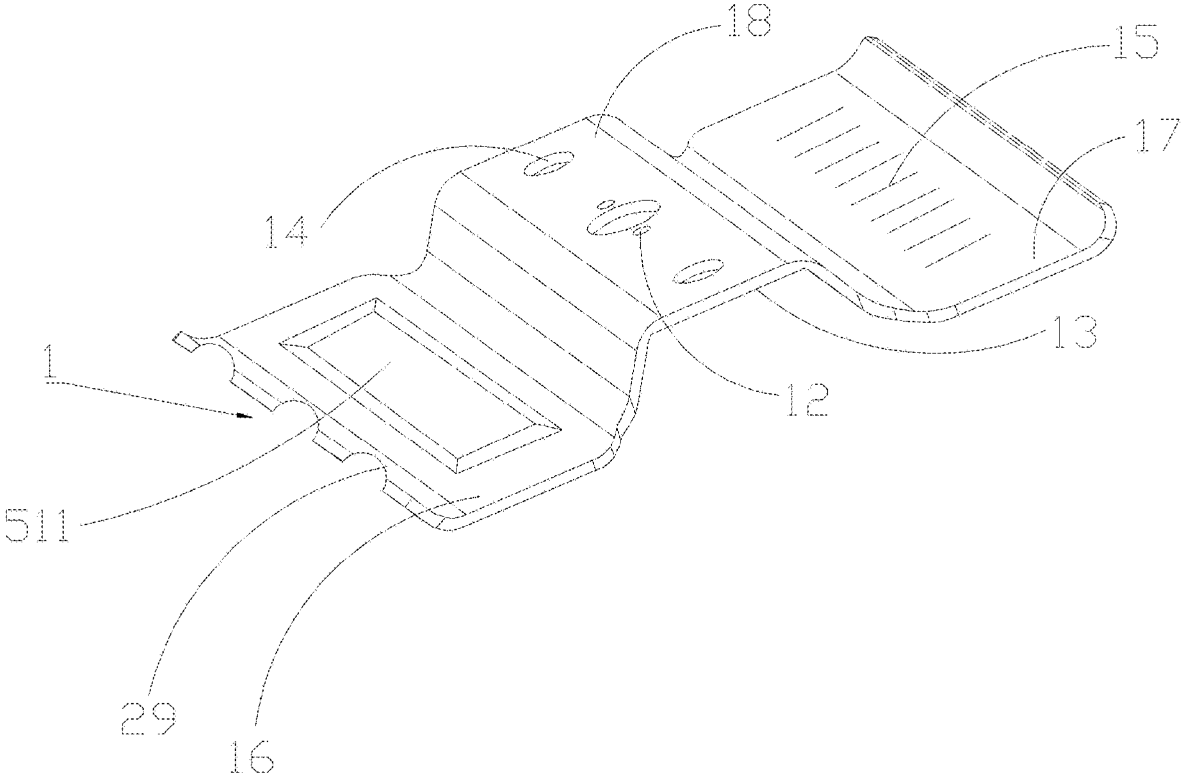
FIG. 8 is a structural schematic diagram of a base, an accommodating groove, and welding holes.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIGS. 1-8, a repair bench includes a base 1, a working platform 2, and a telescopic connecting device 3. One end of the connecting device 3 is connected to the working platform 2, and an opposite end of the connecting device 3 is connected to the base 1.

Through the above structure, the repair bench includes the base 1, the working platform 2, and the telescopic connecting device 3. One end of the connecting device 3 is connected to the working platform 2, and the other end of the connecting device 3 is connected to the base 1. Therefore, when a user uses the working platform 2 to repair a toy car, a height of the working platform 2 is capable of being adjusted through the telescopic connecting device 3, facilitating the user to complete the repair work of the toy car at the most suitable height.

In this embodiment, the connecting device 3 includes a first connecting part 31 and a second connecting part 32. A first mounting hole 321 is defined in the second connecting part 32. The first connecting part 31 is inserted into the first mounting hole 321. The first connecting part 31 is movable and telescopic within the first mounting hole 321, and the first connecting part 31 is rotatable within the first mounting hole 321. The first connecting part 31 and the second connecting part 32 are connected by threads, so that the first connecting part 31 is capable of rotating along the threads and moving and telescoping in the first mounting hole 321 to adjust a length of the connecting device 3. Specifically, the first connecting part 31 is equipped with a first external thread 311, and an inner wall of the first mounting hole 321 is equipped with a first internal thread 322. The first external thread 311 is connected to the first internal thread 322, and the first external thread 311 is capable of rotating along the first internal thread 322 to adjust the length of the connecting device 3. Furthermore, the first external thread 311 extends from an upper side of the first connecting part 31 to a lower side of the first connecting part 31, and the first mounting hole 321 and the first internal thread 322 extend from an upper side of the second connecting part 32 to a lower side of the second connecting part 32. Through the above structure, when the user uses the working platform 2 to repair the toy car, the first external thread 311 is capable of rotating along the first internal thread 322 to adjust the length of the connecting device 3, so as to adjust the height of the working platform 2, making it easier for the user to complete the repair work of the toy car at the most suitable height. Moreover, since the first external thread 311 is capable of rotating along the first internal thread 322 to adjust the length of the connecting device 3, an angle of the working platform 2 can be synchronously adjusted by rotation, making it easier for the user to complete the repair work of the toy car at the most suitable angle.

In this embodiment, the repair bench further includes a locking device 4. The locking device 4 is connected to the first connecting part 31 or the second connecting part 32. The locking device 4 is used for locking the first connecting part 31 to the second connecting part 32, so that the first connecting part 31 is not capable of moving and telescoping in the first mounting hole 321, and the first connecting part is not capable of rotating in the first mounting hole 321. When the locking device 4 is unlocked, the first connecting part 31 is capable of moving and telescoping within the first mounting hole 321, and the first connecting part 31 is capable of rotating within the first mounting hole 321. The locking device 4 includes a first locking member 41. The second connecting part 32 is also equipped with a first inner surface 323, a first outer surface 324, and a first locking hole 325. The first locking hole 325 penetrates from the first outer surface 324 to the first inner surface 323. The first mounting hole 321 and the first internal thread 322 are provided on the first inner surface 323. The first locking member 41 is threaded from the first outer surface 324 through the first locking hole 325 into the first inner surface 323 and presses the first connecting part 31 in the first mounting hole 321. Specifically, the locking device 4 further includes a second locking member 42, and the second connecting part 32 is further provided with a second locking hole 326. The second locking hole 326 penetrates from the first outer surface 324 to the first inner surface 323. The second locking member 42 is threaded from the first outer surface 324 through the second locking hole 326 into the first inner surface 323 and presses the first connecting part 31 in the first mounting hole 321. Furthermore, the first locking hole 325 is positioned on a left side of the second connecting part 32, and the second locking hole 326 is positioned on a right side of the second connecting part 32. The first locking member 41 and the second locking member 42 clamp the first connecting part 31 in the first mounting hole 321. The first locking hole 325 is internally equipped with a second internal thread 3251, and the first locking member 41 is equipped with a second external thread 411. The second internal thread 3251 is connected to the second external thread 411. The second locking hole 326 is internally provided with a third internal thread 3261, and the second locking member 42 is provided with a third external thread 421. The third internal thread 3261 is connected to the third external thread 421. Through the above structure, when the user telescopes the working platform 2 to a suitable height and rotates it to a suitable angle, the first connecting part 31 can be clamped in the first mounting hole 321 through the first locking member 41 and the second locking member 42, so that the first connecting part 31 and the second connecting part 32 cannot be telescoped and rotated, thereby fixing the height and angle of the working platform 2.

In this embodiment, the repair bench further includes a magnetic attraction part 5. The magnetic attraction part 5 is connected to the base 1 or the working platform 2. The magnetic attraction part 5 is used for magnetically attract metal parts. Alternatively, the base and/or the working platform are equipped with an accommodating groove 511. The accommodating groove 511 is configured for accommodating parts. Through the above structure, when the user use the repair bench to repair the toy car, the metal parts removed from the toy car can be attracted by the magnetic attraction part 5, preventing the loss of the parts of the toy car, making it easy for the user to take and place the parts of the toy car, and greatly improving the efficiency of repairing the toy car.

In this embodiment, the repair bench further includes a counterweight block 6. The counterweight block 6 is connected to the base 1. The working platform 2 is connected to the first connecting part 31, and the base 1 is connected to the second connecting part 32. The repair bench further includes first connecting members 11. The base 1 is provided with second mounting holes 12. The second connecting part 32 is also provided with third mounting holes 327, and the counterweight block 6 is also provided with fourth mounting holes 61. The first connecting members 11 sequentially pass through the fourth mounting holes 61, the second mounting holes 12, and the third mounting holes 327 to connect the counterweight block 6, the base 1, and the second connecting part 32 into a whole. The repair bench further includes a second connecting member 21. The working platform 2 is provided with a fifth mounting hole 22, and the first connecting part 31 is also provided with sixth mounting holes 312. The second connecting member 21 sequentially passes through the fifth mounting hole 22 and at least one of the sixth mounting holes 312 to connect the working platform 2 and the first connecting part 31 into a whole. Specifically, a middle portion of the working platform 2 is concave downwards to form a first groove 23, and the fifth mounting hole 22 is positioned on a bottom surface of the first groove 23. A middle portion of the base 1 protrudes upwards to form a second groove 13, and the second mounting holes 12 are positioned on a top surface of the second groove 13. The counterweight block 6 is positioned inside the second groove 13. Through the above structure, the design is reasonable, the connection is stable, and the connection between the working platform 2, the first connecting part 31, the second connecting part 32, the base 1, and the counterweight block 6 is effectively achieved. Moreover, since the base 1 is equipped with the counterweight block 6, the repair bench is more stable as a whole and less prone to shaking, making it easier for the user to complete high-precision toy car repair work. Moreover, since the repair bench is provided with the first groove 23, it is convenient for the user to repair a chassis of the toy car through the first groove 23. A total number of the sixth mounting holes 312 is two. The two sixth mounting holes 312 are respectively positioned at an upper end and a lower end of the first connecting part. Through the above structure, both the upper end and the lower end of the first connecting part can be connected to the working platform, allowing the first connecting part to be connected to the working platform in both directions, facilitating the installation and production of the repair bench.

In this embodiment, a plurality of first placement holes 24 and a plurality of second placement holes 25 are defined in the working platform 2. The first placement holes 24 and the second placement holes 25 are different in size. The plurality of first placement holes 24 are positioned between the plurality of second placement holes 25. The repair bench is used for repairing the toy car, and the first placement holes 24 and the second placement holes 25 are used for the placement of parts of the toy car. An inner diameter of the first placement holes 24 is greater than an inner diameter of the second placement holes 25. Through the above structure, the first placement holes and the second placement holes of different sizes can accommodate the parts of the toy car of different sizes, such as screws and other parts of the toy car of different sizes, and facilitate the classification and management of disassembled parts of the toy car by the user, making it easy for the user to access and store the parts of the toy car, greatly improving the repair efficiency of the toy car.

In this embodiment, the repair bench further includes flexible anti-slip pads 7. The flexible anti-slip pads 7 are connected to an upper surface of the working platform 2. The working platform 2 is also equipped with shock absorber oil addition holes 26 and first notches 27. The shock absorber oil addition holes 26 are L-shaped, and the shock absorber oil addition holes 26 are in communication with the first notches 27. The working platform 2 also includes first stamping positioning holes 28, and the base 1 also includes second stamping positioning holes 14. The anti-slip pads 7 are silicone or rubber anti-slip pads 7. The base 1 and/or the working platform 2 are also equipped with welding holes 29. The welding holes 29 are used for welding parts of the toy car. The repair bench further includes a plurality of flexible foot pads 5111. The flexible foot pads are connected to a bottom surface of the base. First through holes 5112 and second through holes 5113 are defined in the anti-slip pads. The first through holes are aligned with the first placement holes, and the second through holes are aligned with the second placement holes. Through the above structure, the flexible anti-slip pads 7 can not only prevent the toy car from sliding on the working platform 2, but also effectively protect the toy car from being scratched by the working platform 2, and prevent collisions between the toy car and the working platform 2. Moreover, since the shock absorber oil addition holes 26 are defined in the working platform 2, a shock absorber oil dispenser can be slid into the shock absorber oil addition holes through the first notches 27, so that the shock absorber oil dispenser can be fixed, making it easier for the user to accurately add shock absorber oil to a shock absorber of the toy car using the shock absorber oil dispenser. Furthermore, the first stamping positioning holes 28 and the second stamping positioning holes 14 can facilitate the stamping of the working platform 2 and the base 1, and the welding holes 29 can facilitate the welding of the parts of the toy car by the user, thereby improving the repair efficiency of the toy car. A width range of the shock absorber oil addition holes is 1 mm-24 mm, and a width range of the first notches is 1 mm-24 mm. The welding holes are U-shaped.

Figure 9:
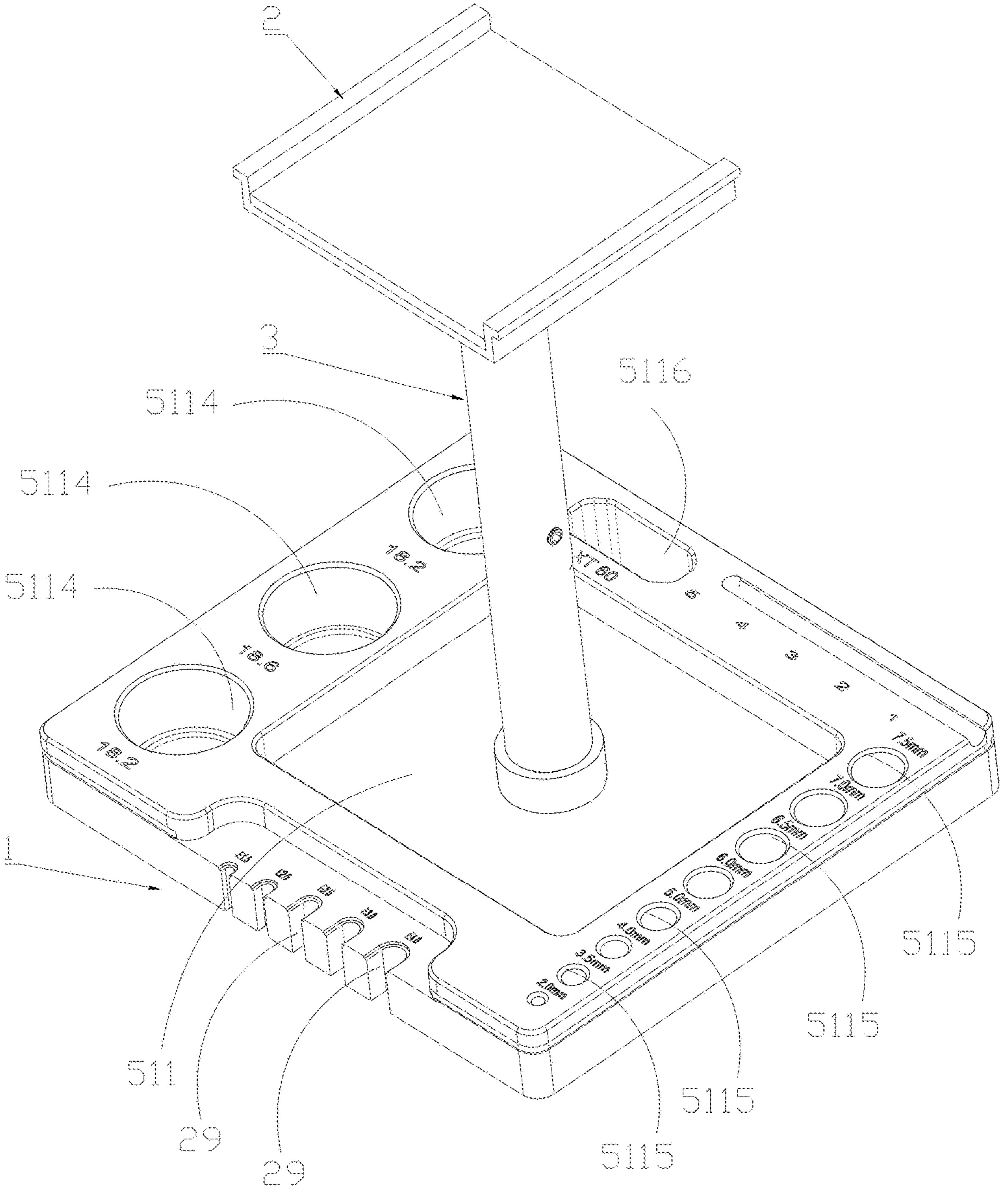
FIG. 9 is another structural schematic diagram of a base, an accommodating groove, and welding holes.

Referring to FIG. 9, in some embodiments, the base is also equipped with a plurality of third placement holes 5114 and a plurality of fourth placement holes 5115. The plurality of third placement holes are positioned on a left side of the base, and the plurality of fourth placement holes are positioned on a right side of the base. The plurality of third placement holes are arranged in sequence from a lower side of the base to an upper side of the base, and inner diameters of the plurality of third placement holes increase sequentially from the lower side of the base to the upper side of the base. The plurality of fourth placement holes are arranged in sequence from the lower side of the base to the upper side of the base, and inner diameters of the plurality of fourth placement holes increase sequentially from the lower side of the base to the upper side of the base. The accommodating groove is positioned between the plurality of third placement holes 5114 and fourth placement holes 5115, and the connecting device is connected to a bottom wall of the accommodating groove. The welding holes are positioned on a lower side of the base. The third placement holes and the fourth placement holes are both circular in shape, and an elliptical fifth placement hole 5116 is also defined in an upper side of the base. A total number of the welding holes is multiple, and the plurality of welding holes are arranged in sequence from left to right. Lengths of the plurality of welding holes increase in sequence from left to right.

In this embodiment, the base 1 and/or the working platform 2 are also equipped with scale markings 15. The scale markings 15 are used for measuring dimensions of parts. Through the above structure, since the base 1 and/or the working platform 2 are also equipped with the scale markings 15, it is easy for the user to measure the dimensions of the parts of the toy car through the scale markings 15, which facilitates the installation, disassembly, and replacement of the parts of the toy car, greatly improving the repair efficiency of the toy car.

In this embodiment, the working platform 2 is provided with a first supporting part 291, a second supporting part 292, and a first intermediate part 293. The first supporting part 291 is connected to one side of the first intermediate part 293, and the second supporting part 292 is connected to an opposite side of the first intermediate part 293. The first intermediate part 293 is depressed downwards to form the first groove 23, and a length of the first intermediate part 293 is less than a length of the first supporting part 291 and a length of the second supporting part 292. The base 1 is provided with a third supporting part 16, a fourth supporting part 17, and a second intermediate part 18. The third supporting part 16 is connected to one side of the second intermediate part 18, and the fourth supporting part 17 is connected to an opposite side of the second intermediate part 18. The second intermediate part 18 protrudes upwards to form the second groove 13, and a length of the second intermediate part 18 is less than a length of the third supporting part 16 and a length of the fourth supporting part 17. A length range of the working platform 2 is 10-840 mm, a width range of the working platform 2 is 10-720 mm, a thickness range of the working platform 2 is 1-12 mm, a length range of the first supporting part 291 and a length range of the second supporting part 292 are 10-840 mm, and a width range of the first supporting part 291 and a width range of the second supporting part 292 are 10-300 mm. A depth range of the first groove 23 is 2-120 mm, and a width range of the first groove 23 is 10-300 mm. A length range of the base 1 is 10-840 mm, a width range of the base 1 is 10-720 mm, a thickness range of the base 1 is 1-12 mm, a length range of the third supporting part 16 and a length range of the fourth supporting part 17 are 10-840 mm, and a width range of the third supporting part 16 and a width range of the fourth supporting part 17 are 5-260 mm. A depth range of the second groove 13 is 2-120 mm, and a width range of the second groove 13 is 3-300 mm. A length range of the first connecting part 31 is 2-450 mm, a width range of the first connecting part 31 is 1-70 mm, a length range of the second connecting part 32 is 2-360 mm, and a width range of the second connecting part 32 is 2-150 mm. A length range of the counterweight block 6 is 5-420 mm, a width range of the counterweight block 6 is 3-180 mm, a thickness range of the counterweight block 6 is 1-60 mm, and a weight range of the counterweight block 6 is 20-1000 g. Specifically, a length range of the magnetic attraction part 5 is 5-500 mm, a width range of the magnetic attraction part 5 is 2-180 mm, and a thickness range of the magnetic attraction part 5 is 1-12 mm. Through the above structure, the setting of the first groove 23 and the second groove 13 is effectively achieved, and the above dimensions are reasonably designed to adapted to various sizes of toy cars, such as small toy cars and large toy racing cars.

In this embodiment, the working platform 2 is a metal working platform 2, the first connecting part 31 is a metal first connecting part 31, the second connecting part 32 is a metal second connecting part 32, and the base 1 is a metal base 1. The first connecting members 11 and the second connecting member 21 are both screws.

In this embodiment, a total number of the shock absorber oil addition holes 26 is two, and the two shock absorber oil addition holes 26 are respectively positioned on both sides of the working platform 2. A total number of the first notches 27 is two, and the two first notches 27 are respectively positioned on both sides of the working platform 2. A total number of the second mounting holes 12, a total number of the third mounting holes 327, and a total number of the fourth mounting holes 61 are all two. The two second mounting holes 12 are respectively positioned on both sides of the base 1, the two third mounting holes 327 are respectively positioned on both sides of the second connecting part 32, and the two fourth mounting holes 61 are respectively positioned on both sides of the counterweight block 6. Specifically, the repair bench further includes the flexible anti-slip pads 7, and a total number of the flexible anti-slip pads 7 is two. The two flexible anti-slip pads 7 are respectively connected to the first supporting part 291 and the second supporting part 292. Furthermore, an outer side wall of the second connecting part 32 is equipped with a plurality of concave anti-slip lines 328. Furthermore, a length range of the anti-slip pads 7 is 10-840 mm, a width range of the anti-slip pads 7 is 10-300 mm, and a thickness range of the anti-slip pads 7 is 1-18 mm. An inner diameter range of the first placement holes and an inner diameter range of the second placement holes are 2-100 mm. Through the above structure, the design is reasonable and the structure is simple, which not only effectively achieves the connection between the working platform 2, the first connecting part 31, the second connecting part 32, the base 1, and the counterweight block 6, but also makes the connection between the working platform 2, the first connecting part 31, the second connecting part 32, the base 1, and the counterweight block 6 more stable.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A repair bench, comprising:

a base;

a working platform; and a telescopic connecting device; wherein one end of the connecting device is connected to the working platform, and an opposite end of the connecting device is connected to the base;

wherein the connecting device comprises a first connecting part and a second connecting part, a first mounting hole is defined in the second connecting part, the first connecting part is inserted into the first mounting hole, the first connecting part is movable and telescopic within the first mounting hole, and the first connecting part is rotatable within the first mounting hole;

wherein the repair bench further comprises a counterweight block, wherein the counterweight block is connected to the base;

wherein the working platform is connected to the first connecting part, and the base is connected to the second connecting part; the repair bench further comprises first connecting members, the base is provided with second mounting holes, the second connecting part is also provided with third mounting holes, and the counterweight block is also provided with fourth mounting holes; the first connecting members sequentially pass through the fourth mounting holes, the second mounting holes, and the third mounting holes to connect the counterweight block, the base, and the second connecting part into a whole; the repair bench further comprises a second connecting member, the working platform is provided with a fifth mounting hole, the first connecting part is also provided with sixth mounting holes, and the second connecting member sequentially passes through the fifth mounting hole and at least one of the sixth mounting hole to connect the working platform and the first connecting part into a whole.

2. The repair bench according to claim 1, wherein the first connecting part and the second connecting part are connected by threads, so that the first connecting part is capable of rotating along the threads and moving and telescoping in the first mounting hole to adjust a length of the connecting device.

3. The repair bench according to claim 2, wherein the first connecting part is equipped with a first external thread, an inner wall of the first mounting hole is equipped with a first internal thread, the first external thread is connected to the first internal thread, and the first external thread is capable of rotating along the first internal thread to adjust the length of the connecting device.

4. The repair bench according to claim 3, wherein the first external thread extends from an upper side of the first connecting part to a lower side of the first connecting part, and the first mounting hole and the first internal thread extend from an upper side of the second connecting part to a lower side of the second connecting part.

5. The repair bench according to claim 1, further comprising a locking device, wherein the locking device is connected to the first connecting part or the second connecting part, and the locking device is used for locking the first connecting part to the second connecting part, so that the first connecting part is not capable of moving and telescoping in the first mounting hole, and the first connecting part is not capable of rotating in the first mounting hole; when the locking device is unlocked, the first connecting part is capable if moving and telescoping within the first mounting hole, and the first connecting part is capable of rotating within the first mounting hole.

6. The repair bench according to claim 5, wherein the locking device comprises a first locking member; the second connecting part is also equipped with a first inner surface, a first outer surface, and a first locking hole; the first locking hole penetrates from the first outer surface to the first inner surface, the first mounting hole and the first internal thread are provided on the first inner surface, the first locking member is threaded from the first outer surface through the first locking hole into the first inner surface and presses the first connecting part in the first mounting hole.

7. The repair bench according to claim 6, wherein the locking device further comprises a second locking member, the second connecting part is further provided with a second locking hole, the second locking hole penetrates from the first outer surface to the first inner surface, and the second locking member is threaded from the first outer surface through the second locking hole into the first inner surface and presses the first connecting part in the first mounting hole.

8. The repair bench according to claim 7, wherein the first locking hole is positioned on a left side of the second connecting part, the second locking hole is positioned on a right side of the second connecting part, and the first locking member and the second locking member clamp the first connecting part in the first mounting hole; the first locking hole is internally equipped with a second internal thread, the first locking member is equipped with a second external thread, and the second internal thread is connected to the second external thread; the second locking hole is internally provided with a third internal thread, the second locking member is provided with a third external thread, and the third internal thread is connected to the third external thread.

9. The repair bench according to claim 1, further comprising a magnetic attraction part, wherein the magnetic attraction part is connected to the base or the working platform, and the magnetic attraction part is used for magnetically attract metal parts.

10. The repair bench according to claim 9, wherein a length range of the magnetic attraction part is 5-500 mm, a width range of the magnetic attraction part is 2-180 mm, and a thickness range of the magnetic attraction part is 1-12 mm.

11. The repair bench according to claim 1, wherein a middle portion of the working platform is concave downwards to form a first groove, and the fifth mounting hole is positioned on a bottom surface of the first groove; a middle portion of the base protrudes upwards to form a second groove, the second mounting holes are positioned on a top surface of the second groove, and the counterweight block is positioned inside the second groove.

12. The repair bench according to claim 11, wherein the working platform is provided with a first supporting part, a second supporting part, and a first intermediate part; the first supporting part is connected to one side of the first intermediate part, the second supporting part is connected to an opposite side of the first intermediate part, the first intermediate part is depressed downwards to form the first groove, and a length of the first intermediate part is less than a length of the first supporting part and a length of the second supporting part; the base is provided with a third supporting part, a fourth supporting part, and a second intermediate part; the third supporting part is connected to one side of the second intermediate part, the fourth supporting part is connected to an opposite side of the second intermediate part, the second intermediate part protrudes upwards to form the second groove, and a length of the second intermediate part is less than a length of the third supporting part and a length of the fourth supporting part.

13. The repair bench according to claim 12, wherein a total number of the sixth mounting holes is two, and the two sixth mounting holes are respectively positioned at an upper end and a lower end of the first connecting part; a length range of the working platform is 10-840 mm, a width range of the working platform is 10-720 mm, a thickness range of the working platform is 1-12 mm, a length range of the first supporting part and a length range of the second supporting part are 10-840 mm, and a width range of the first supporting part and a width range of the second supporting part are 10-300 mm; a depth range of the first groove is 2-120 mm, and a width range of the first groove is 10-300 mm; a length range of the base is 10-840 mm, a width range of the base is 10-720 mm, a thickness range of the base is 1-12 mm, a length range of the third supporting part and a length range of the fourth supporting part are 10-840 mm, and a width range of the third supporting part and a width range of the fourth supporting part are 5-260 mm; a depth range of the second groove is 2-120 mm, and a width range of the second groove is 3-300 mm; a length range of the first connecting part is 2-450 mm, a width range of the first connecting part is 1-70 mm, a length range of the second connecting part is 2-360 mm, and a width range of the second connecting part is 2-150 mm; a length range of the counterweight block is 5-420 mm, a width range of the counterweight block is 3-180 mm, a thickness range of the counterweight block is 1-60 mm, and a weight range of the counterweight block is 20-1000 g.

14. The repair bench according to claim 1, wherein the base and/or the working platform are also equipped with scale markings, and the scale markings are used for measuring dimensions of parts.

15. The repair bench according to claim 1, wherein either the base, the working platform, or both is equipped with an accommodating groove, and the accommodating groove is configured for accommodating parts.

16. A repair bench, comprising:

a base;

a working platform; and a telescopic connecting device; wherein one end of the connecting device is connected to the working platform, and an opposite end of the connecting device is connected to the base;

wherein a plurality of first placement holes and a plurality of second placement holes are defined in the working platform, the first placement holes and the second placement holes are different in size, and the plurality of first placement holes are positioned between the plurality of second placement holes;

wherein the repair bench further comprises flexible anti-slip pads, wherein the flexible anti-slip pads are connected to an upper surface of the working platform, the working platform is also equipped with shock absorber oil addition holes and first notches, the shock absorber oil addition holes are L-shaped, and the shock absorber oil addition holes are in communication with the first notches; the working platform also comprises first stamping positioning holes, and the base also comprises second stamping positioning holes; the base and/or the working platform are also equipped with welding holes, and the welding holes are used for welding parts of the toy car; the repair bench further comprises a plurality of flexible foot pads, and the flexible foot pads are connected to a bottom surface of the base; first through holes and second through holes are defined in the anti-slip pads, the first through holes are aligned with the first placement holes, and the second through holes are aligned with the second placement holes; the base is also equipped with a plurality of third placement holes and a plurality of fourth placement holes, the plurality of third placement holes are positioned on a left side of the base, the plurality of fourth placement holes are positioned on a right side of the base, the plurality of third placement holes are arranged in sequence from a lower side of the base to an upper side of the base, inner diameters of the plurality of third placement holes increase sequentially from the lower side of the base to the upper side of the base, the plurality of fourth placement holes are arranged in sequence from the lower side of the base to the upper side of the base, and inner diameters of the plurality of fourth placement holes increase sequentially from the lower side of the base to the upper side of the base.

17. The repair bench according to claim 16, wherein the repair bench is used for repairing a toy car, the first placement holes and the second placement holes are used for the placement of parts of the toy car, and an inner diameter of the first placement holes is greater than an inner diameter of the second placement holes.

18. A repair bench, comprising:

a base;

a working platform; and a telescopic connecting device; wherein one end of the connecting device is connected to the working platform, and an opposite end of the connecting device is connected to the base;

wherein a plurality of first placement holes are defined in the working platform, wherein the repair bench further comprises flexible anti-slip pads, wherein the flexible anti-slip pads are connected to an upper surface of the working platform; the working platform also comprises first stamping positioning holes, and the base also comprises second stamping positioning holes; the repair bench further comprises a plurality of flexible foot pads, and the flexible foot pads are connected to a bottom surface of the base; first through holes and second through holes are defined in the anti-slip pads, the first through holes are aligned with the first placement holes.

* * * * *